United States Patent
Menke et al.

(10) Patent No.: US 10,221,020 B2
(45) Date of Patent: Mar. 5, 2019

(54) TRANSFER DEVICE, CONVEYOR SYSTEM INCLUDING A TRANSFER DEVICE AND METHOD OF TRANSFERRING CONVEYED PRODUCTS

(71) Applicant: REXNORD FLATTOP EUROPE B.V., 's-Gravenzande (NL)

(72) Inventors: Cornelis Hendrik Mijndert Menke, 's-Gravenzande (NL); Leonardus Adrianus Catharinus Cornelissen, 's-Gravenzande (NL); Remco van der Ende, 's-Gravenzande (NL)

(73) Assignee: REXNORD FLATTOP EUROPE B.V., S-Gravenzande (NL)

(*) Notice: Subject to any disclaimer, the term of this patent is extended or adjusted under 35 U.S.C. 154(b) by 0 days.

(21) Appl. No.: 15/122,769

(22) PCT Filed: Mar. 6, 2015

(86) PCT No.: PCT/NL2015/050146
§ 371 (c)(1),
(2) Date: Aug. 31, 2016

(87) PCT Pub. No.: WO2015/133904
PCT Pub. Date: Sep. 11, 2015

(65) Prior Publication Data
US 2017/0073171 A1     Mar. 16, 2017

(30) Foreign Application Priority Data
Mar. 6, 2014   (NL) .................................... 2012375

(51) Int. Cl.
*B65G 47/66* (2006.01)
*B65G 47/52* (2006.01)
(Continued)

(52) U.S. Cl.
CPC .................................... *B65G 47/66* (2013.01)

(58) Field of Classification Search
None
See application file for complete search history.

(56) References Cited

U.S. PATENT DOCUMENTS 2,180,284 A    11/1939   Meyer
2,237,345 A     4/1941   Frentzel, Jr. et al.
(Continued)

FOREIGN PATENT DOCUMENTS

DE    3444132 A1    6/1986
EP    0344411 A2    12/1989
(Continued)

OTHER PUBLICATIONS

International Search Report and Written Opinion dated May 29, 2015 in connection with PCT/NL2015/050146.

*Primary Examiner* — Kavel Singh
(74) *Attorney, Agent, or Firm* — Quarles & Brady LLP

(57) ABSTRACT

A transfer device (19), comprising a carrier (21) including a number of mutually spaced-apart, substantially parallel extending transfer fingers (22) that in use reach into grooves (14) between ribs (13) on a conveying surface of a grooved conveyor belt (2). Back parts (23) of the fingers form a comb shaped part (24) of a substantially planar slide-over surface (25) of the transfer device. The carrier further includes a conveyor guide track (26) that is lowered with respect to the slide over surface and that extends transversely to the fingers, and that in use is provided with a cross conveyor belt (6) movable in a conveying direction transversely to the fingers, so that a conveying surface (9) of the cross conveyor belt forms a conveying part (27) of the slide-over surface that is substantially contiguous to and flush with the comb shaped part (24). At a side opposite to the fingers the carrier further includes a hinge connection (29) extending trans- (Continued)

versely to the fingers, and being spaced apart from the fingers. Further, the carrier includes support surfaces that in is use are supported on the grooved conveyor belt.

15 Claims, 4 Drawing Sheets

(51) Int. Cl.
*B65G 47/74* (2006.01)
*B65G 15/30* (2006.01)

(56) References Cited

U.S. PATENT DOCUMENTS

| | | | |
|---|---|---|---|
| 3,870,141 | A | 3/1975 | Lapeyre et al. |
| 4,273,234 | A * | 6/1981 | Bourgeois ............. B65G 47/57 198/347.3 |
| 4,958,726 | A | 9/1990 | Fett et al. |
| 4,989,723 | A | 2/1991 | Bode et al. |
| 5,322,158 | A | 6/1994 | Borsboom et al. |
| 5,597,063 | A | 1/1997 | Bogle et al. |
| 6,296,110 | B1 * | 10/2001 | van Zijderveld ...... B65G 47/66 198/325 |
| 7,448,490 | B2 | 11/2008 | de Geus et al. |
| 2009/0084659 | A1 | 4/2009 | Underberg et al. |

FOREIGN PATENT DOCUMENTS

| | | |
|---|---|---|
| EP | 0700843 A1 | 3/1996 |
| EP | 0722896 A1 | 7/1996 |
| EP | 0903247 A1 | 3/1999 |
| EP | 1 546 011 A1 | 6/2005 |
| WO | 0013993 A1 | 3/2000 |

* cited by examiner

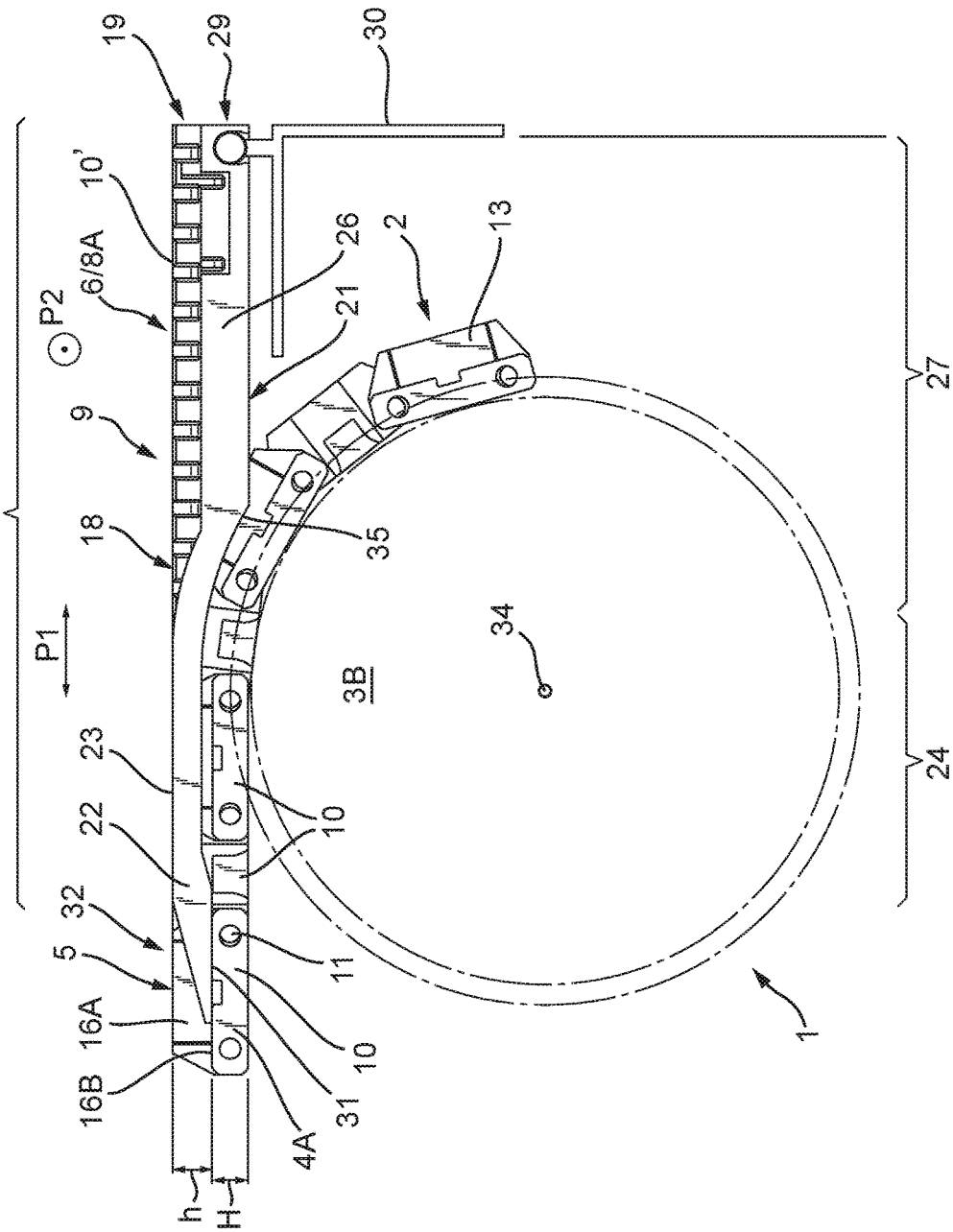

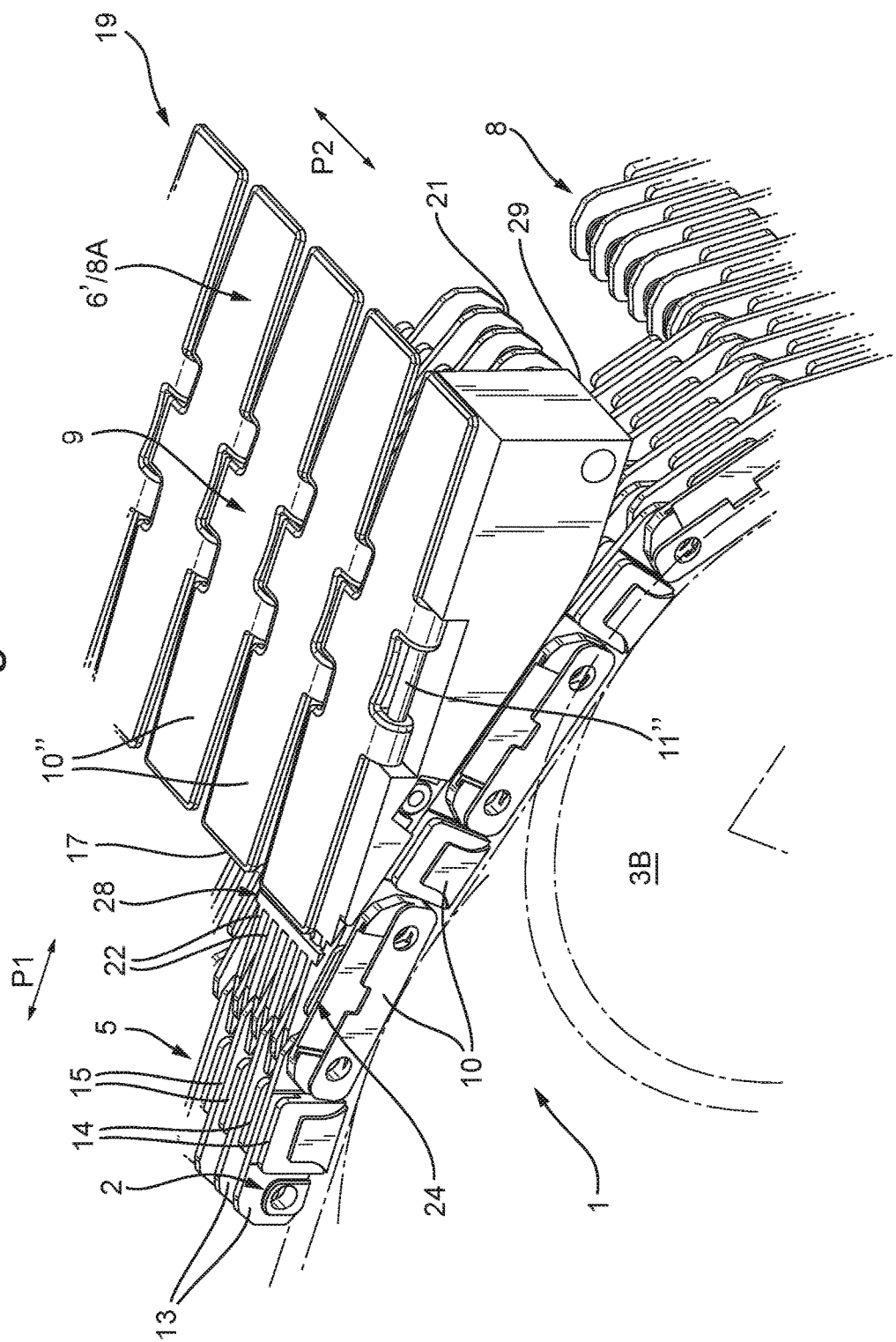

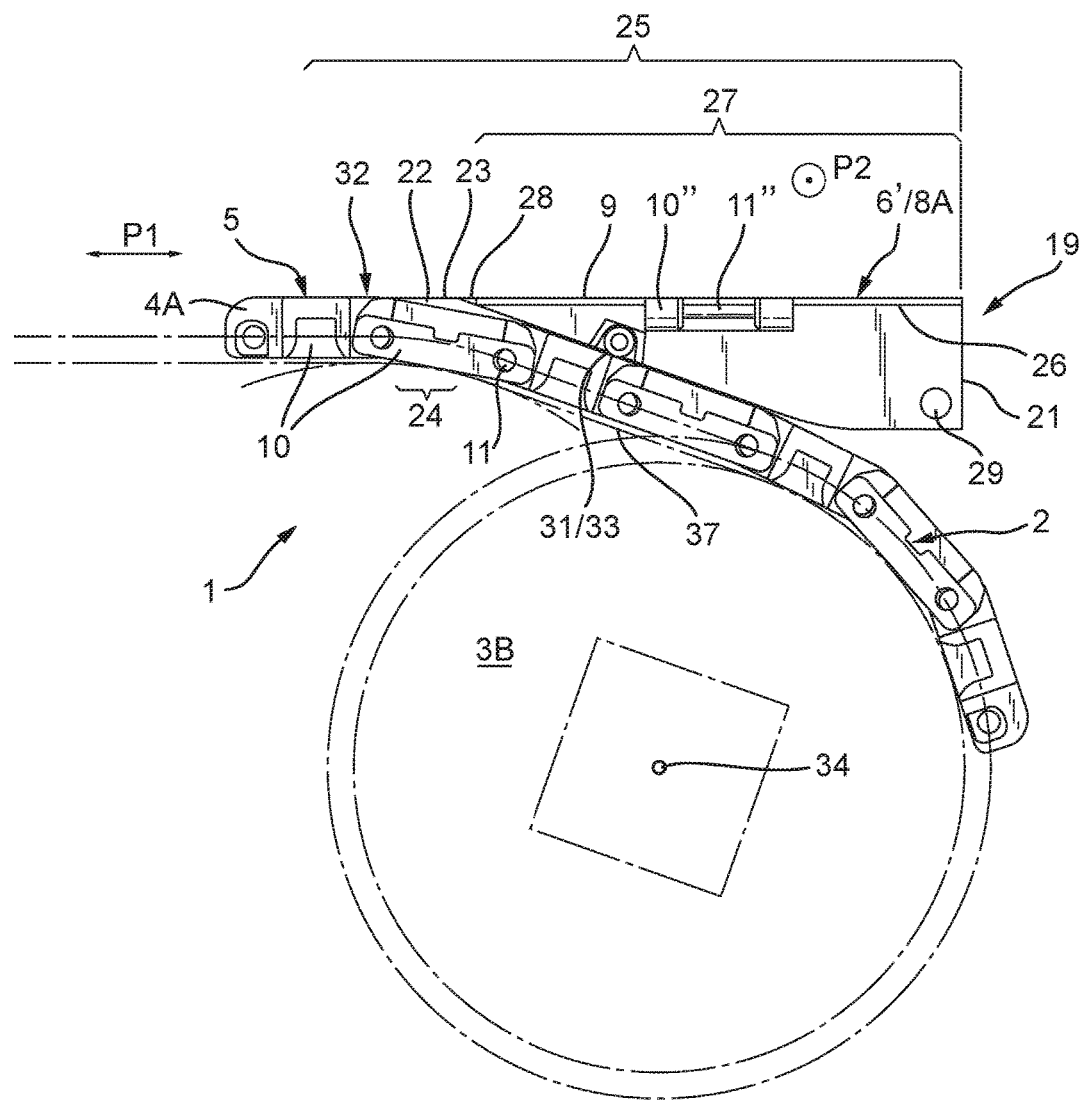

TRANSFER DEVICE, CONVEYOR SYSTEM INCLUDING A TRANSFER DEVICE AND METHOD OF TRANSFERRING CONVEYED PRODUCTS

CROSS-REFERENCE TO RELATED APPLICATIONS

This Application represents the national stage entry of PCT International Application No. PCT/NL2015/050146 filed Mar. 6, 2015, which claims priority to Netherlands Patent Application No. 2012375 filed Mar. 6, 2014, the contents of which are hereby incorporated by reference in their entirety for all purposes.

The invention generally relates to transferring conveyed products, and specifically to a transfer device for transferring products between conveyor belts of a conveyor system.

Conveying systems are generally known and are used for conveying products in, for instance, the packaging and food industries. The conveyor belts of these systems can be designed, for instance, as one piece rubber mats or metal mesh belts, but also as modular mats or chains from metal and/or plastic. The belts are often endless, and recirculate between divert elements. The divert elements can be designed, for instance, as sprocket wheels or idler wheels, but also, for instance, as single or multiple chain wheels. In conveying systems, often a number of conveyor belts are connected in succession.

At places where products are to be conveyed to or from the conveying surface, e.g. at right-angled and in-line transitions between conveyor belts and at processing stations, slide-over devices are used. An example of such a slide-over device is a slide-over plate with fingers that cooperate with grooves formed in the surface of a conveyor belt.

The conveying systems are nowadays often used to convey small batches of products. Preferably, the conveying systems are then designed such that the conveying system is self-clearing, without human intervention. A disadvantage of the slide-over plates, also called finger plates or combs, is that at the end of a production run, the last products remain behind on the slide-over plates.

To mitigate this disadvantage, in applicant's EP 1 546 011 a conveying system has been proposed that comprises an endless grooved conveyor belt circulating between at least first and second divert elements, a top run of the grooved conveyor belt forming a first conveying surface movable between the divert elements in a first conveying direction, and an endless cross conveyor belt circulating between at least third and fourth divert elements, a top run of the cross conveyor belt forming a second conveying surface movable between the divert elements in a second conveying direction. The top run of the cross conveyor belt is arranged to extend at least partly above and along the second divert element, so that the first and second conveyor belts, while including a gap-shaped interspace, are in mutually transverse alignment.

In the gap-shaped interspace, a transfer device is arranged, comprising a carrier including a number of mutually spaced-apart, substantially parallel extending transfer fingers that reach into grooves between ribs on a conveying surface of the grooved conveyor belt. Back parts of the fingers form a comb shaped part of a substantially planar slide-over surface of the slide over device. The carrier further includes a conveyor guide track that is lowered with respect to the slide over surface and that extends transversely to the fingers, and that supports the top run of the cross conveyor belt to move in a conveying direction transversely to the fingers, so that a conveying surface of the cross conveyor belt forms a conveying part of the slide-over surface that is substantially contiguous to and flush with the comb shaped part. This way, the conveying surfaces link up without an intervening "dead" area.

A disadvantage of this system is that the fingers are relatively delicate, and that the backs of the fingers at the free ends of the relatively easily lift up from the conveying surface, due to debris caught in the grooves and/or due to too much clearance between the bottom of the fingers and the grooves., e.g. due to the conveying surfaces being misaligned. This in practice causes products to fall when sliding onto the comb shaped part of the transfer device. It may also cause increased uplifting of the fingers, which in turn may cause the fingers to bend upwards and/or break.

The object of the invention is to provide a transfer device for a conveying system with which the disadvantages mentioned can be alleviated. To that end, the invention provides for a transfer device, comprising a carrier including a number of mutually spaced-apart, substantially parallel extending transfer fingers that in use reach into grooves between ribs on a conveying surface of a grooved conveyor belt, back parts of the fingers forming a comb shaped part of a substantially planar slide-over surface of the slide over device, the carrier further including a conveyor guide track that is lowered with respect to the slide over surface and that extends transversely to the fingers, and that in use is provided with a cross conveyor belt movable in a conveying direction transversely to the fingers, so that a conveying surface of the cross conveyor belt forms a conveying part of the slide-over surface that is substantially contiguous to and flush with the comb shaped part, wherein the carrier at a side opposite to the fingers further includes a hinge connection extending transversely to the fingers, and being spaced apart from the fingers, and wherein the carrier includes support surfaces that in is use are supported on the grooved conveyor belt. By hingedly supporting the cross conveyor on the grooved conveyor via the carrier, it may be biased to follow the grooved conveyor, so that the tips of fingers stay flush with the grooved conveyor.

Transverse to the direction in which the fingers extend, the transfer device may include a plurality of subsequent carriers arranged in a row. This allows for more localized following of the grooved conveyor, which is particularly helpful for when the grooved conveyor is wide, and more subject to sag. Alternatively, or in addition, transverse to the direction in which the fingers extend, the fingers may be arranged on the carrier in a plurality of groups of fingers that are detachable as a group, or as individual fingers than may be detachable individually. This facilitates replacement and/or localized following. The fingers may be hingedly or bendably connected to the carrier to facilitate following.

When the support surface includes a planar surface that in use cooperates with a flat section of the grooved conveyor belt it may be prevented that the support surface is subjected to motion perpendicular to the conveyor belt. This is particularly advantageous when the grooved conveyor belt is a modular conveyor belt, of which the modules generate undesired up-and downward motion in a curved section due to polygonal effect. As an alternative, the support surface may include a curved surface. The support surface may in use cooperate with a curved section of the grooved conveyor belt. Such curved surface may be provided with a curvature that is larger than the radius of a divert wheel, return wheel or sprocket wheel of the grooved conveyor, e.g. at least twice or at least three times the radius of such a wheel, and the curved section of the grooved conveyor may include a support that supports the section of the grooved conveyor belt and that is curved to provide the curved section of the grooved conveyor with a matching curvature. The support surface may then e.g. in use cooperate with a curved sloping section of the top run of the grooved conveyor that extends adjacent a divert wheel, return wheel or sprocket wheel. Such curvature of a curved support surface may as another example match the radius of a divert wheel, return wheel or sprocket wheel of the grooved conveyor, and may then cooperate with a curved section of the grooved conveyor that extends around the sprocket wheel, return wheel or divert wheel. The support surface may then e.g. in use cooperate with a curved section of the grooved conveyor that is formed by curved bottoms of grooves in adjacent modules of a modular conveyor belt that align to form a circle section when rounding such wheel, and which form a support for a curved support surface provided on a base of a transfer finger or comb.

The support surfaces may e.g. be provided at bottom parts of free ends of the fingers, which may be supported on a horizontal flat section of the grooved conveyor belt. The bottom parts of the fingers may include a cutaway section having a clearing surface that is raised relative to a support surface that in use cooperates with a flat section of the grooved conveyor belt. The bottom parts may at the clearing surface be free of contact with the grooved conveyor belt, so that when the grooved conveyor belt is a modular conveyor belt, the cutaway section prevents that the bottom part of the fingers is kicked up by the modules rounding the second divert wheels in a polygon.

The support surfaces may alternatively or in addition be provided on a bottom part of the carrier located below the conveyor guide track, e.g. on a bottom part of the carrier located below the conveyor guide track forming a flat section that slopes upward towards the transfer fingers. This way, the fingers need not be involved in transferring the weight of products on the slide over surface, and may be constructed relatively lightly.

The support surfaces may include rollers to reduce friction, e.g. rollers that are rotatably held in the carrier.

The carrier may be hingedly connected to a support structure, for example the support structure of the grooved conveyor and/or the support structure of the cross conveyor. Alternatively, it may have its own support structure.

When part of a subassembly of a conveying system, the transfer device may include a cross conveyor belt provided in the conveyor guide track, movable in a conveying direction transversely to the fingers, or may include a grooved conveyor belt movable in a conveying direction parallel to the transfer fingers, the transfer fingers reaching into grooves between ribs on the conveying surface of the grooved conveyor belt. Such conveyor belts may be modular or not.

The invention further relates to a conveying system, comprising an endless grooved conveyor belt circulating between at least first and second divert elements, a top run of the grooved conveyor belt forming a first conveying surface movable between the divert elements in a first conveying direction, and an endless cross conveyor belt circulating between at least third and fourth divert elements, a top run of the cross conveyor belt forming a second conveying surface movable between the divert elements in a second conveying direction, wherein the top run of the cross conveyor belt is arranged to extend at least partly above and along the second divert elements, so that the first and second conveyor belts, while including a gap-shaped interspace, are in mutually transverse alignment, and wherein in the gap-shaped interspace, a transfer device as set out above is arranged, so that a number of mutually spaced-apart, substantially parallel extending transfer fingers of the carrier reach into grooves between ribs on the conveying surface of the grooved conveyor belt, and back parts of the fingers form a comb shaped part of a substantially planar slide-over surface of the slide over device, and wherein the conveyor guide track of the carrier supports the top run of the cross conveyor belt to move in a conveying direction transversely to the fingers, so that a conveying surface of the cross conveyor belt forms a conveying part of the slide-over surface that is substantially contiguous to and flush with the comb shaped part, and wherein the carrier at a side opposite to the fingers includes a hinge connection extending transversely to the fingers, and being spaced apart from the fingers, and wherein the carrier includes support surfaces that are supported on the grooved conveyor belt.

To prevent unwanted up-or downward motion of the fingers and/or the carrier caused by the grooved conveyor belt being modular, the support surfaces may be supported on a flat section of the grooved conveyor belt. Such a flat section may be a horizontal flat section, but may alternatively be a inclined flat section.

The fingers may extend towards the first divert elements so that support surfaces at free ends thereof are located beyond a centerline of the second divert elements. This way, the support surfaces may reach a flat, uninclined section of the grooved conveyor belt. The support surfaces may be supported on sloping side faces of the grooves and/or on the bottoms of the groove. To create space for a relatively sturdy finger, the ribs on the grooved conveyor may be made relatively tall.

The top run of the grooved conveyor may be provided with a flat section that slopes downward towards the second divert wheel, preferably corresponding to a flat section at a bottom part of the carrier located below the cross conveyor that slopes upward towards the transfer fingers. This way, space may be created for a relatively thick carrier, and yet the fingers may be constructed relatively lightly.

The invention further relates to a method of transferring products wherein products are fed from a moving part of a planar slide over surface to a grooved conveyor or vice versa via a comb shaped part of the slide over surface, and wherein the slide over surface is supported on the grooved conveyor, and the comb shaped part is biased so to follow the grooved conveyor.

Further advantageous embodiments of the invention are represented in the description of the drawings and in the dependent claims.

It should be noted, that the technical features and method steps described in this disclosure may each on their own be embodied in a transfer device, system or method for transferring conveyed products, i.e. isolated from the context in which it is described, separate from other features or steps, or in combination with only a number of the other features or steps described in the context in which it is disclosed. Each of these features or steps may further be combined with any other step or feature disclosed, in any combination.

The invention will be further elucidated on the basis of exemplary embodiments which are represented in a drawing. In the drawing:

FIG. 1b shows a schematic side view of the system of FIG. 1a;

FIG. 2a shows a schematic perspective view of a second embodiment of a conveyor system including a transfer device according to the invention, and FIG. 2b shows a schematic side view of the system of FIG. 2a.

It is noted that the figures merely are schematic representations of preferred embodiments of the invention and should merely be construed as a non-limiting examples. In the figures, the same or corresponding parts are designated with the same reference numerals.

Figure 1A:
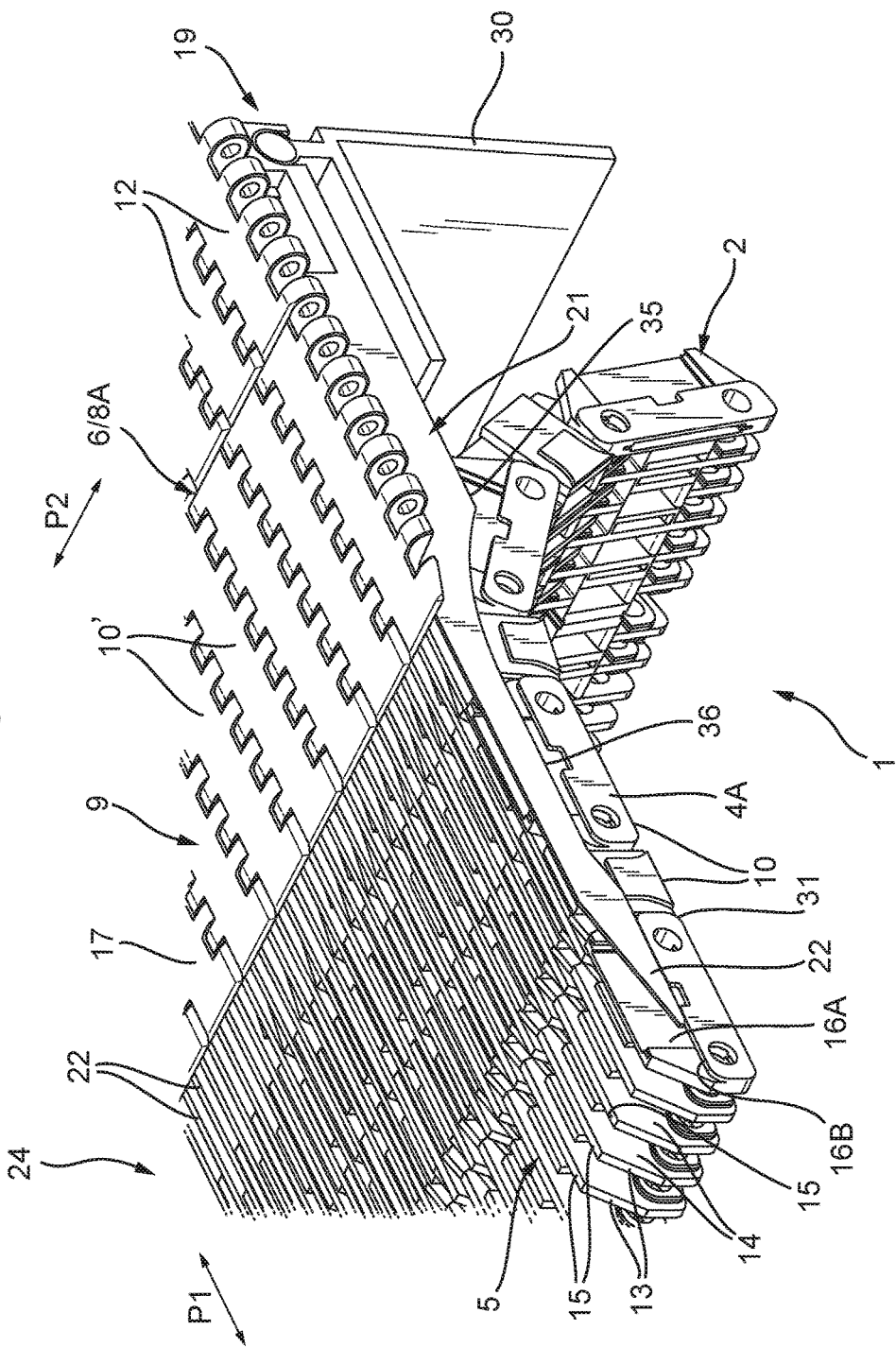
FIG. 1a shows a schematic perspective view of a first embodiment of a conveyor system including a transfer device according to the invention.

Referring to FIGS. 1a and 1b, there is shown a detail of a conveying system 1. The conveying system 1 comprises an endless grooved conveyor belt 2 circulating between first divert wheels 3A (not shown) and second divert wheels 3B (shown in dotted lines). The grooved conveyor belt 2 comprises a top run 4A and a bottom run 4B (not shown). The top run 4A forms a first conveying surface 5 movable between the first 3A and second 3B divert wheels in a first conveying direction represented by arrow P1. The conveying system 1 further comprises an endless cross conveyor belt 6 circulating between third divert wheels 7A (not shown) and fourth divert wheels 7B (not shown). The cross conveyor belt 6 comprises a top run 8A and a bottom run 8B (not shown). The top run 8A forms a second conveying surface 9, movable between the third and fourth divert wheels in a second conveying direction indicated by the arrow P2. The top run 8A of the cross conveyor belt 6 extends at least partly above and alongside the second divert wheels 3B. In particular, the top run 8A of the cross conveyor belt 7 extends at least partly above and along a downwardly extending quadrant of the second divert wheels 3B. The grooved conveyor belt 2 and the cross conveyor belt 6 are in transverse mutual alignment, and include a gap-shaped interspace 20.

The grooved conveyor belt 2 is here designed as a modular conveying mat which is built up from a number of successive modules 10 in conveying direction P1, which have been coupled via hinge pins 11. Transversely to the conveying direction P1, the mat may be built up from a number of rows 12 of juxtaposed modules 10 which have been coupled by the hinge pins 11 extending throughout width of the mat. The modules in consecutive rows 12 may be arranged identically, but the modules in consecutive rows 12 may also be arranged staggered, to provide the conveyor belt 2 with a brick pattern. The basic construction of a modular conveying mat is known to those skilled in the art, for instance from U.S. Pat. No. 3,870,141, WO 00/13993 or EP 0 903 247.

In this embodiment, the top faces of the modules 10 have been provided with ribs 13, which define grooves 14 in the conveying surface 9 formed by the back parts 15 of the ribs. The back parts 15 of the ribs form the lands between the grooves 14, the longitudinal side parts of the ribs 13 define the side faces 16A of the grooves, and the top surface of the body portion of the modules 10 defines the bottom face 16B of the grooves. In this design, the ribs 13 are relatively tall: the height h of the ribs is equal to or higher than the height of the body portion of the modules.

The grooves 14 need not be formed between ribs. They may e.g. alternatively be formed by providing troughs in a top surface of a module 10. Then, the side faces 16A and the bottom face 16B of the groove 14 is formed by the side faces and bottom face of the trough. In a design according to the invention, the grooves 14 may preferably be relatively deep: the side faces 16A of the grooves 14 have a height h that is equal to or more than the height H of the bottom parts 16B of the grooves 14 above the bottom face of the body part of the module 10. This allows the fingers 22 to be designed relatively sturdily, and also allows the cross conveyor 6 to be placed with its longitudinal edge 17 relatively close to the centerline 34 of the second divert wheel 3B, so that the size of the dead zone can be reduced further.

The cross conveyor belt 6 is here likewise designed as a modular conveying mat from plastic. This modular conveying mat is built up from two parallel uncoupled chains of successive modules 10' that each move in the second conveying direction P2. The longitudinal edge 17 of the cross conveyor belt 6 proximal to the grooved first conveyor belt 2 is provided with a bevel 18 to make the dead zone formed between the first conveying surface 5 of the grooved conveyor belt 2 and the second conveying surface 9 of the cross conveyor 6 as small as possible. Such a beveled conveying mat is known, for instance, from EP 0 722 896. It is noted that the bevel 18 may also be constructed using separate bevel units which are secured to longitudinal edges of the individual conveyor modules 10'. The cross conveyor belt 6 may also include a single chain of modules 10', and may alternatively include rows of juxtaposed modules 10' that are coupled via shared hinge pins.

Arranged in the interspace 20 is a transfer device 19. The transfer device 19 comprises a carrier 21 that includes a number of mutually spaced-apart, substantially parallel extending transfer fingers 22. The fingers 22 cooperate with grooves 14 extending in conveying direction P1 in the conveying surface 5 of the grooved conveyor belt 2. The transfer fingers 22 reach into the grooves 14 between the ribs 13 on the conveying surface 5 of the grooved conveyor belt 2. Back parts 23 of the fingers 22 form a comb shaped part 24 of a substantially planar slide-over surface 25 of the transfer device 19. The comb shaped part 24 of the slide-over surface 25 formed by the back parts 23 of the fingers 22 overlaps with the conveying surface 5 of the grooved conveyor belt.

The carrier 21 includes a conveyor guide track 26 that is lowered with respect to the slide over surface 25, and that extends transversely to the fingers 22. In FIG. 1b, the cross section of the guide track 26 is indicated with a dotted line. The guide track 26 guides the cross conveyor belt 6 so that is can move in a conveying direction P2 transversely to the fingers 22. The conveying surface 9 of the cross conveyor belt 6 in use forms a conveying part 27 of the slide-over surface 25 that is substantially contiguous to, and flush with the comb shaped part 24. Contiguous is in this disclosure meant to express that the conveying part 27 of the slide over surface 25 may be may reach up to the comb shaped part 24, but that it may also be interspaced, e.g. by an intermediate part 28 (shown) in FIG. 2a of the slide over surface 25 that is closed or perforated. This interspacing is preferably less than a few cm, e.g. less than 5 cm, and is more preferably less than 3 cm or even less than 1 cm.

The carrier 21 includes at a side opposite to the fingers 22 a hinge connection 29 extending transversely to the fingers 22. The hinge connection 29 is spaced apart from the free ends of the fingers 22, e.g. by at least the width of a module 10' of the cross conveyor 6. This way, a relatively large difference in height between the first and second conveyor surfaces may be bridged with a relatively small angle of inclination on the slide-over surface 25. In this example the carrier 21 is via the hinge connection 29 hingedly connected to a support structure 30 of the cross conveyor 6.

The carrier 21 includes support surfaces 31 that in is use are supported on the grooved conveyor belt 2. This way, the carrier 21 is biased to follow the grooved conveyor, so that the tips 32 of fingers 22 carried on the carrier 21 stay flush with the first conveying surface 5 of the grooved conveyor 3. This is particularly helpful to actively compensate for any shifts in height that occur between the first and second conveyor surfaces, e.g. due to loading, sag or thermal expansion of the support structure of the grooved conveyor or cross conveyor.

In the second conveying direction P2, the transfer device may include a plurality of subsequent carriers arranged in a row. Alternatively, or in addition, to in the second conveying direction P2 the fingers 22 may be arranged on the carrier 21 in a plurality of groups of fingers that are detachable as a group, or as individual fingers than may be detachable individually. The fingers 22 may be hingedly or bendably connected to the carrier 21.

The support surface 31 here includes a planar surface that in use cooperates with a flat section 37 of the grooved conveyor belt 2, so that the grooved conveyor belt 2 does not impart motion perpendicular to the conveying plane 5 to the support surface 31. The support surface 31 need not be flat, and may be curved, i.e. convex or concave. Also, the section of the grooved conveyor belt may be supported to have a curvature, e.g. at a supporting shoe that supports the top run of the grooved conveyor belt adjacent a divert wheel and that is provided with a relatively large convex curvature, e.g. at least three times the radius of curvature of the divert wheel. The support surfaces 31 are in this embodiment provided at bottom parts of the tips or free ends 32 of the fingers 22, and are supported on the bottoms of the grooves of the grooved conveyor belt 2. To create space for a relatively sturdy finger, the grooves 19 have been made relatively deep. In particular, the ribs 13 on the grooved conveyor 2 have been made relatively tall as discussed above. The fingers 22 extend towards the first divert wheels 3A so that the support surfaces 31 at free ends 32 thereof are located beyond a centerline 34 of the second divert wheels 3B. The bottom parts 35 of the fingers include a cutaway section 36 that has a clearing surface that is raised relative to the support surface 31. The bottom parts 35 of the fingers 22 are at the cutaway section 36 free of contact with the grooved conveyor belt.

In operation, products carried on the cross conveyor 6 are fed from the moving part of the planar slide over surface formed by the conveying surface 9 of the cross conveyor 6 via the comb shaped part of the slide over surface to the conveying surface to a grooved conveyor, or vice versa. During this, the slide over surface is supported on the grooved conveyor, and the comb shaped part is biased onto the grooved conveyor so as to follow it when there occurs a height difference, e.g. when the conveyor surface sags due to the product load. Above the conveyors, guide rails may be arranged in a conventional way to guide the products along a desired path across the transfer device 19.

Referring to FIGS. 2a and 2b, a second embodiment of a transfer device in accordance with invention is shown. In this embodiment, the cross conveyor belt 2' is built up as a single track of modular chain. The chain track is built up from a number of successive modules 10" in conveying direction P2, coupled by hinge pins 11'. The hinge pins 11' couple only the successive modules 10' of a chain track, so that the juxtaposed tracks of the chain are not coupled. Such a modular chain is known to those skilled in the art and is described inter alia in EP 0 344 411 or EP 0 700 843.

In this embodiment, the support surfaces are provided as rollers 33 that are rotatably held on a flat, upward sloping section 37 of the bottom part of the carrier 21 located below the conveyor guide track 26. The rollers 33 are in this embodiment supported on the backs 15 of the ribs 13 of the modules 10' of the grooved conveyor 2. This way, the fingers are not involved in transferring the weight of products on the slide over surface, and have been constructed relatively lightly. The top run 4A of the grooved conveyor 2 has been provided with a flat section 37 that slopes downward towards the second divert wheel 3B, and here corresponds to the flat section at a bottom part of the carrier 21 that slopes upward towards the transfer fingers 22. Such a downward flat section 37 need not be located adjacent the second return wheel 3B, and may e.g. be located more towards the first return wheel 3A, to form a cascade in the top run 4A that creates space for the transfer device 19 supported on the lower section of the cross conveyor to in turn support the cross conveyor 2 with its second conveying surface 9 flush with the first conveying surface 5 of the grooved conveyor belt 2. The support surfaces of the transfer device may then e.g. be supported on the lands between the grooves, the side faces and/or the bottoms of the grooves at a horizontal and/or inclined section at the lower part of the cascade in the grooved conveyor belt 2.

It shall be clear that the invention is not limited to the embodiment described here.

It is noted that the fingers can be mutually differently designed, and the interspace between the successive fingers can be different, for instance when the pattern of grooves in the grooved conveyor belt has been chosen to be of a design with alternating interspaces or of an irregular design. Also, a supporting surface formed by the intermediate elements can be designed as a slide-over plate which may or may not be provided with apertures or grooves, which is arranged in the entry of the gap-shaped interspace.

Furthermore, instead of being designed as a modular conveying mat, a conveyor belt can also be manufactured in one piece.

In addition, both the first and the second conveyor belt can circulate between more than two divert elements. For instance, the second conveyor belt can circulate in a rectangle, passing around four divert elements, while optionally a further divert element may be used to tension the belt. The grooved conveyor and/or the cross conveyor may cooperate with further conveyors.

It is also noted that the system can be traversed with products in two directions. Products may e.g. be slid over from the conveying surface of the grooved conveyor via the backs of the fingers to the conveying surface of the cross conveyor, or may be slid over from the conveying surface of the cross conveyor via the backs of the fingers onto the conveying surface of the grooved conveyor. A conveying system may include a grooved conveyor with a cross conveyor at each end, e.g. a grooved pasteurizer conveyor belt with cross conveyors as infeed and outfeed.

These and many other variations are possible within the scope of the invention as set defined in the appended claims.

LIST OF REFERENCE NUMERALS

1. Conveying system
2. Grooved conveyor belt
3A. First divert wheels (not shown)
3B. Second divert wheels
4A. Top run grooved conveyor belt
4B. Bottom run grooved conveyor belt (not shown)
5. First conveying surface
6. Cross conveyor belt
7A. Third divert wheels (not shown)
7B. Fourth divert wheels (not shown)
8A. Top run cross conveyor belt
8B. Bottom run cross conveyor belt (not shown)

9. Second conveying surface
10. Modules (10', 10")
11. Hinge pins (11')
12. Rows
13. Ribs
14. Grooves
15. Back parts of the ribs
16A. Side faces groove
16B. Bottom face groove
17. Longitudinal edge cross conveyor
18. Bevel
19. Transfer device
20. Interspace
21. Carrier
22. Fingers
23. Back parts of the fingers
24. Comb shaped part
25. Slide over surface
26. Conveyor guide surface
27. Conveying part
28. Intermediate part
29. Hinge connection
30. Support structure
31. Support surface
32. Tip/Free end
33. Roller
34. Centerline third divert wheel
35. Bottom part finger
36. Cutaway section at bottom part finger
37. Flat section
P1 First conveying direction
P2 Second conveying direction
H Height module (bottom face to top face module)
h height sides groove (lands to bottom face groove)

The invention claimed is:

1. A transfer device comprising:
 a number of mutually spaced-apart, substantially parallel extending transfer fingers extending from a carrier, in use said fingers reach into grooves between ribs on a conveying surface of a grooved conveyor belt;
 back parts of the fingers forming a comb shaped part of a substantially planar slide-over surface of the transfer device;
 a conveyor guide track lower than the slide over surface and extending transversely to the fingers, in use conveyor guide track guides a cross conveyor belt movable in a conveying direction transversely to the fingers, so that a conveying surface of the cross conveyor belt forms a conveying part of the slide-over surface that is substantially contiguous to and flush with the comb shaped part,
 a hinge connection extending transversely to the fingers at a side of the carrier opposite to the fingers, and being spaced apart from the fingers; and
 support surfaces on said carrier supported on the grooved conveyor belt.

2. The transfer device of claim 1, wherein the support surfaces includes a planar surface that in use cooperates with a flat section of the grooved conveyor belt.

3. The transfer device of claim 1, wherein planar support surfaces are provided at bottom parts of free ends of the fingers.

4. The transfer device of claim 1, wherein the bottom parts of the fingers include a cutaway section having a clearing surface that is raised relative to a support surface of said support surfaces that in use cooperates with a flat section of the grooved conveyor belt.

5. The transfer device of claim 1, wherein the support surfaces are provided on a bottom part of the carrier located below the conveyor guide track.

6. The transfer device of claim 1, wherein the support surfaces include rollers.

7. The transfer device of claim 6, wherein the rollers are rotatably held in the carrier.

8. The transfer device of claim 1, wherein a bottom part of the carrier located below the conveyor guide track includes a flat section that slopes upward towards the transfer fingers.

9. The transfer device of claim 1, wherein the carrier is hingedly connected to a support structure of the grooved conveyor and/or the cross conveyor.

10. The transfer device of claim 1, further including a cross conveyor belt guided by the conveyor guide track, movable in a conveying direction transversely to the fingers.

11. The transfer device of claim 1, further including a grooved conveyor belt movable in a conveying direction parallel to the transfer fingers, the transfer fingers reaching into grooves between ribs on the conveying surface of the grooved conveyor belt.

12. A conveying system having an endless grooved conveyor belt circulating between at least first and second divert elements, a top run of the grooved conveyor belt forming a first conveying surface movable between the divert elements in a first conveying direction, and an endless cross conveyor belt circulating between at least third and fourth divert elements, a top run of the cross conveyor belt forming a second conveying surface movable between the divert elements in a second conveying direction, wherein the top run of the cross conveyor belt is arranged to extend at least partly above and along the second divert elements, so that the first and second conveyor belts, while including a gap-shaped interspace, are in mutually transverse alignment, and wherein, said conveyor system comprising:
 a transfer device according to claim 1 in the gap-shaped interspace, said transfer device being arranged, so that a number of the mutually spaced-apart, substantially parallel extending transfer fingers of the carrier each reach into grooves between ribs on the conveying surface of the grooved conveyor belt, and back parts of the fingers from a comb shaped part of a substantially planar slide-over surface of the transfer device, and wherein the conveyor guide track of the carrier supports the top run of the cross conveyor belt to move in a conveying direction transversely to the fingers, so that a conveying surface of the cross conveyor belt forms a conveying part of the slide-over surface that is substantially contiguous to and flush with the comb shaped part, and wherein the carrier at a side opposite to the fingers includes a hinge connection extending transversely to the fingers, and being spaced apart from the fingers, and wherein the carrier includes support surfaces that are supported on the grooved conveyor belt.

13. The system of claim 12, wherein the support surfaces are supported on a flat section of the grooved conveyor belt.

14. The system of claim 12, wherein the fingers extend towards the first divert elements so that support surfaces at free ends thereof are located beyond a centerline of the second divert elements.

15. The system of claim 12, wherein the top run of the grooved conveyor is provided with a flat section that slopes downward towards the second divert wheel, preferably corresponding to a flat section at a bottom part of the carrier located below the cross conveyor that slopes upward toward that transfer fingers.

\* \* \* \* \*

UNITED STATES PATENT AND TRADEMARK OFFICE
CERTIFICATE OF CORRECTION

PATENT NO. : 10,221,020 B2
APPLICATION NO. : 15/122769
DATED : March 5, 2019
INVENTOR(S) : Cornelis Hendrik Mijndert Menke et al.

It is certified that error appears in the above-identified patent and that said Letters Patent is hereby corrected as shown below:

In the Claims

Column 9, Claim 1, Line 45, "use con-" should be --use said con- --.

Column 9, Claim 2, Line 58, "includes" should be --include--.

Column 9, Claim 4, Line 63, "wherein the bottom" should be --wherein bottom--.

Column 10, Claim 12, Line 42, "each" should be --reach--.

Column 11, Claim 15, Lines 2-3, "toward that" should be --towards the--.

Signed and Sealed this
Sixteenth Day of April, 2019

Andrei Iancu
*Director of the United States Patent and Trademark Office*